(12) United States Patent
Noguchi et al.

(10) Patent No.: US 10,310,199 B2
(45) Date of Patent: Jun. 4, 2019

(54) OPTICAL MODULE AND TRANSMISSION EQUIPMENT

(71) Applicant: Oclaro Japan, Inc., Sagamihara, Kanagawa (JP)

(72) Inventors: Daisuke Noguchi, Kanagawa (JP); Kazuhiro Komatsu, Tokyo (JP)

(73) Assignee: Oclaro Japan, Inc., Kanagawa (JP)

( * ) Notice: Subject to any disclaimer, the term of this patent is extended or adjusted under 35 U.S.C. 154(b) by 0 days.

(21) Appl. No.: 15/834,095

(22) Filed: Dec. 7, 2017

(65) Prior Publication Data

US 2018/0172932 A1 Jun. 21, 2018

(30) Foreign Application Priority Data

Dec. 16, 2016 (JP) .................................. 2016-244109

(51) Int. Cl.
*G02B 6/36* (2006.01)
*G02B 6/42* (2006.01)

(52) U.S. Cl.
CPC .......... *G02B 6/4274* (2013.01); *G02B 6/428* (2013.01); *G02B 6/4281* (2013.01); *G02B 6/4249* (2013.01); *G02B 6/4263* (2013.01)

(58) Field of Classification Search
USPC .................................................... 385/14, 88
See application file for complete search history.

(56) References Cited

U.S. PATENT DOCUMENTS

| | | | | |
|---|---|---|---|---|
| 4,455,356 A | * | 6/1984 | Barrett, Jr. ............ | H01M 10/16 429/121 |
| 5,660,946 A | * | 8/1997 | Kump ................... | H01M 2/043 429/178 |
| 2012/0177321 A1 | * | 7/2012 | Kuwahara ............ | G02B 6/4206 385/35 |
| 2016/0006210 A1 | * | 1/2016 | Noguchi ............. | H01L 31/0203 438/26 |

FOREIGN PATENT DOCUMENTS

| | | |
|---|---|---|
| JP | 2006-080418 A | 3/2006 |
| JP | 2016-018862 A | 2/2016 |

* cited by examiner

*Primary Examiner* — Eric Wong
(74) *Attorney, Agent, or Firm* — Mattingly & Malur, PC (57) ABSTRACT

Provided are an optical module and a transmission equipment in which a decrease in yield due to brazing or soldering is suppressed. Provided is an optical module including a semiconductor optical element, a stem, and a wiring substrate. The stem includes one or more lead terminals. The wiring substrate includes one or more openings through which the one or more lead terminals, respectively, pass. The stem has a placing surface on which the wiring substrate is placed, and two protrusion portions that are arranged on both external sides, respectively, of the wiring substrate. The wiring substrate further includes a ground conductor layer being positioned on a rear surface and two ground conductor patterns that are arranged on regions, respectively, that are in the vicinity of the two protrusion portions, of a front surface, and are electrically connected to the ground conductor layer.

8 Claims, 11 Drawing Sheets

OPTICAL MODULE AND TRANSMISSION EQUIPMENT

CROSS-REFERENCE TO RELATED APPLICATION

The present application claims priority from Japanese application JP 2016-244109, filed on Dec. 16, 2016, the content of which is hereby incorporated by reference into this application.

BACKGROUND OF THE INVENTION

1. Field of the Invention

The present invention relates to an optical module and a transmission equipment, and particularly to a technology that suppresses a decrease in yield due to brazing or soldering.

2. Description of the Related Art

Generally, an optical module that includes a stem having two lead terminals and one ground terminal, and a wiring substrate (for example, a flexible printed circuit (FPC)) that is connected to the stem, is used. In this case, the stem and the wiring substrate need to be electrically connected to each other. For this reason, the wiring substrate has three openings that correspond to the two lead terminals and the one ground terminal of the stem. The two lead terminals and the one ground terminal are caused to pass through the three openings, soldering is performed, and thus the stem and the wiring substrate are electrically connected to each other.

However, according to a demand for miniaturization of the optical module in recent years, miniaturization of the stem is required. Therefore, it is desirable that without providing a ground terminal on the stem, a ground conductor layer of the flexible printed circuit and a contact surface of the stem are electrically brought into contact with each other. In JP 2016-018862 A, a structure is disclosed in which a notch portion in the shape of approximately a semicircle is provided on both sides of the flexible printed circuit and the attachment portion of the flexible printed circuit and the contact surface of the stem are caused to be electrically connected to each other by performing soldering.

SUMMARY OF THE INVENTION

However, when the stem and the wiring substrate are connected to each other and then are mounted into the optical module, if an external force is applied to the wiring substrate, stress is applied to a place where the stem and the wiring substrate are connected to each other. As a result of inventors' earnest investigation, in a structure of the flexible printed circuit that is disclosed in JP 2016-018862 A, the connection surface of the stem is a flat surface, and thus in some cases, solder that is provided on a place where the notch portion of the flexible printed circuit and the stem are connected to each other flows outside of an outer edge of the connection surface of the stem (that is, to an external diameter of the stem). The inventors obtained the knowledge that in the case where the flowing-out of the solder occurs, a problem can be derived from packaging of the stem and other components.

An object of the present invention, which was made in view of the problems described, is to provide an optical module and a transmission equipment in which a decrease in yield due to brazing or soldering is suppressed.

(1) In order to solve the problems described above, according to an aspect of the present invention, there is provided an optical module including: a semiconductor optical element; a stem that includes one or more lead terminals that transfers an electric signal that is input into the semiconductor optical element and/or that is output from the semiconductor optical element; and a wiring substrate that includes one or more openings through which the one or more lead terminals, respectively, pass. The stem has a placing surface which the wiring substrate faces and on which the wiring substrate is placed, and two protrusion portions that are arranged on both external sides, respectively, of the wiring substrate, and that protrude along a direction normal to the placing surface. The wiring substrate further includes: a ground conductor layer that is positioned on a rear surface that faces the placing surface of the stem, and two ground conductor patterns that are arranged on regions, respectively, that are in the vicinity of the two protrusion portions, of a front surface that is opposite to the rear surface, and are electrically connected to the ground conductor layer. The two protrusion portions of the stem are electrically connected to the two ground conductor patterns, electrically, by performing brazing or soldering.

(2) In the optical module according to (1) described above, the wiring substrate may include one or more through-holes in regions on which the two ground conductor patterns, respectively, are arranged, when viewed from above. The two ground conductor patterns may be electrically connected to the ground conductor layer through at least a part of the one or more through-holes, respectively, by performing the brazing or soldering.

(3) In the optical module according to (1) or (2) described above, the wiring substrate further may include one or more strip conductors that are electrically connected to the one or more lead terminals, respectively, and extend in a first direction from the one or more lead terminals, respectively, on the front surface. A region where the two ground conductor patterns are brazed or soldered to the two protrusion portions, respectively, of the front surface of the wiring substrate may be arranged in a direction in which the one or more strip conductors extend along the first direction from the one or more lead terminals, respectively.

(4) In the optical module according to any one of (1) to (3), a distance between the placing surface and an uppermost portion of the protrusion portion may be greater than a thickness of the wiring substrate.

(5) In the optical module according to any one of (1) to (4), the one or more lead terminals that are included in the stem may be a pair of lead terminals to which a differential signal is transmitted, and the pair of lead terminals may be arranged side by side in a second direction that intersects the first direction.

(6) According to an aspect of the present invention, there is provided a transmission equipment into which the optical module according to any one of (1) to (5) is may be mounted.

According to the present invention, an optical module and a transmission equipment in which a decrease in yield due to brazing or soldering are provided is suppressed.

DETAILED DESCRIPTION OF THE INVENTION

Embodiments of the present invention will be described specifically and in detail below with reference to the drawings. It is noted that in all the drawings for describing the embodiments, components that have the same function are given the same reference numeral, and that a repeated description thereof is omitted. It is noted that the following figures are only for describing an implementation example of an embodiment, and that sizes in the figures are not necessarily consistent with a scale for a description of the present implementation example.

First Embodiment

Figure 1:
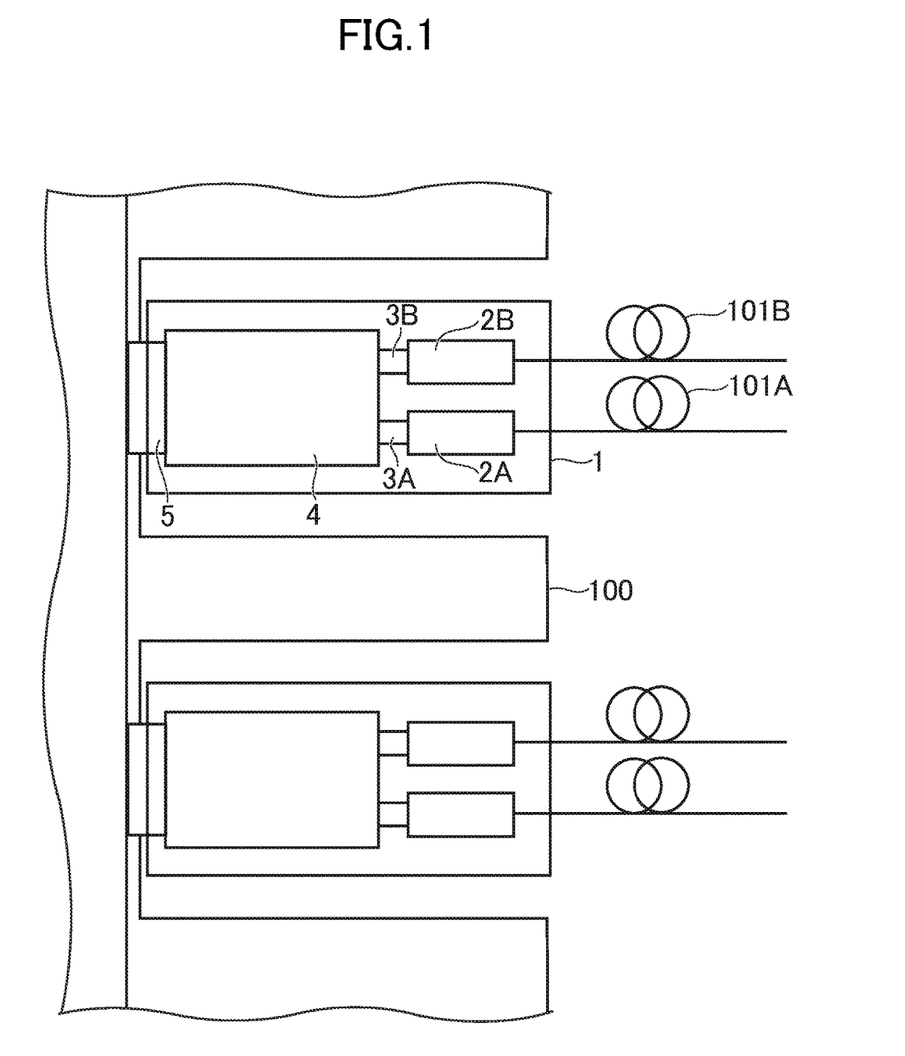
FIG. 1 is a schematic diagram illustrating a configuration of an optical module according to a first embodiment of the present invention.

FIG. 1 is a schematic diagram illustrating a configuration of an optical module 1 according to a first embodiment of the present invention. The optical module 1 according to the embodiment is a transceiver, having a function of optical transmitting and a function of optical receiving, which includes an optical transmitter module 2A, an optical receiver module 2B, flexible printed circuits 3A and 3B, a printed circuit substrate 4, and an electricity connector 5.

A plurality of the optical modules 1 are mounted into a transmission equipment 100 with the electricity connectors 5, respectively. The transmission equipment 100, for example, is a high-capacity router or switch. The transmission equipment 100, for example, has a function of a switching system, and is positioned in a base station or the like. The transmission equipment 100 acquires reception data (a reception electric signal) from one of the optical modules 1, determines which data is transmitted to which place, generates transmission data (a transmission electric signal), and transfers the generated data to another of the optical modules 1.

The optical transmitter module 2A of the optical module 1 converts the transmission electric signal into a wavelength division multiplexing optical signal, and transmits the resulting signal to an optical fiber 101A. The optical receiver module 2B of the optical module 1 converts a wavelength division multiplexing optical signal that is received through an optical fiber 101B into the reception electric signal. The printed circuit substrate 4, the optical transmitter module 2A, and the optical receiver module 2B are connected to each other through flexible printed circuits (flexible printed circuit (FPC)) 3A and 3B. The transmission electric signal is transmitted from the printed circuit substrate 4 to the optical transmitter module 2A through the flexible printed circuit 3A. The reception electric signal is transmitted from the optical receiver module 2B to the printed circuit substrate 4 through the flexible printed circuit 3B.

An optical transmission system according to the embodiment includes two or more optical modules 1, two or more transmission equipments 100, and one or more optical fibers 101. One or more optical modules 1 are mounted into the two or more transmission equipments 100, respectively. The optical fibers 101 are connected between the optical modules 1 that are mounted into the two or more transmission equipments 100, respectively. The transmission data that is generated by one of the two or more transmission equipments 100 is converted by the optical module that is mounted, and the resulting optical signal is transmitted to the optical fiber 101. The optical signal that is transmitted over the optical fiber 101 is received by the optical module 1 that is mounted into another of the two or more transmission equipments 100, and the optical module 1 converts the optical signal into an electric signal, and transmits the resulting signal as the reception data to the transmission equipment 100.

The optical module 1 according to the embodiment has a bit rate of 100 Gbit/s, and is optimal for a CFP family, and a QSFP 28 (each MSA specification). In the CFP family and the QSFP 28, the optical module 1 performs transmission using four channels (the optical transmitter module 2A) and performs reception using four channels (the optical receiver module 2B), and is used for WDM (wavelength-division multiplexing). A bit rate of the electric signal that is transmitted on each of the channels ranges from 25 Gbit/s to 28 Gbit/s.

Figure 2:
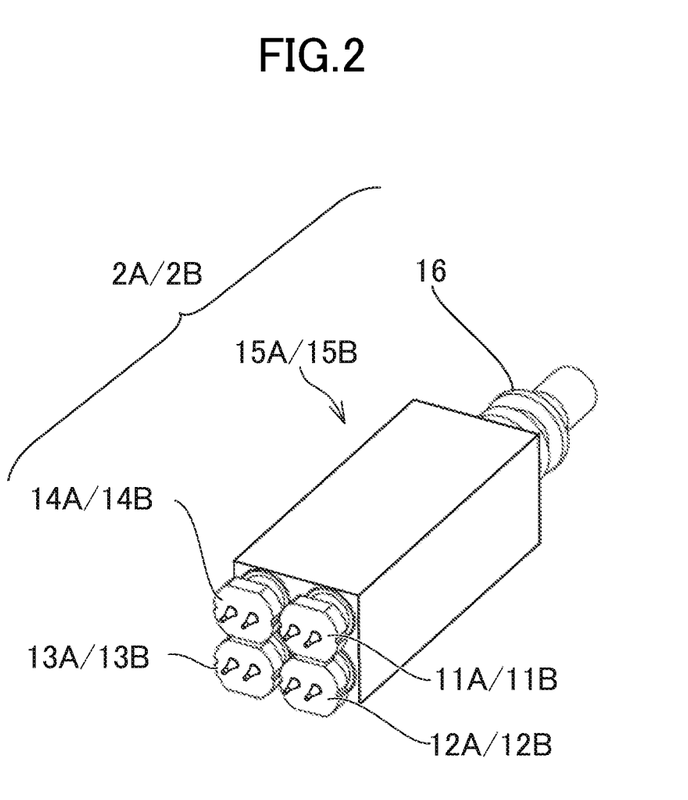
FIG. 2 is a schematic perspective diagram illustrating configurations of an optical transmitter module and an optical receiver module according to the first embodiment of the present invention.

FIG. 2 is a schematic perspective diagram illustrating configurations of the optical transmitter module 2A and the optical receiver module 2B according to the embodiment. At this point, the optical transmitter module 2A will be described. The optical transmitter module 2A according to the embodiment includes four laser diode (LD) modules, that is, LD modules 11A, 12A, 13A, and 14A, and an optical multiplexer (MUX) module 15A. The optical MUX module 15A has a built-in optical multiplexing function of the optical transmitter module 2A and includes a sleeve assembly 16 for connecting light (the wavelength division multiplexing optical signal), which results from the multiplexing, to an external optical fiber 101A. The four LD modules, that is, the LD modules 11A, 12A, 13A, and 14A each emit optical signals of different wavelengths. For example, for use in CWDM, the four LD modules, that is, the LD modules 11A, 12A, 13A, and 14A emit optical signals of optical lengths in four wave length bands, a 1271 nm band, a 1291 nm band, a 1311 nm band, and a 1331 nm band, respectively. It is noted that the optical receiver module 2B includes four photo diode (PD) modules, PD modules 11B, 12B, 13B, and 14B, and an optical demultiplexer (DeMUX) module 15B.

Figure 3:
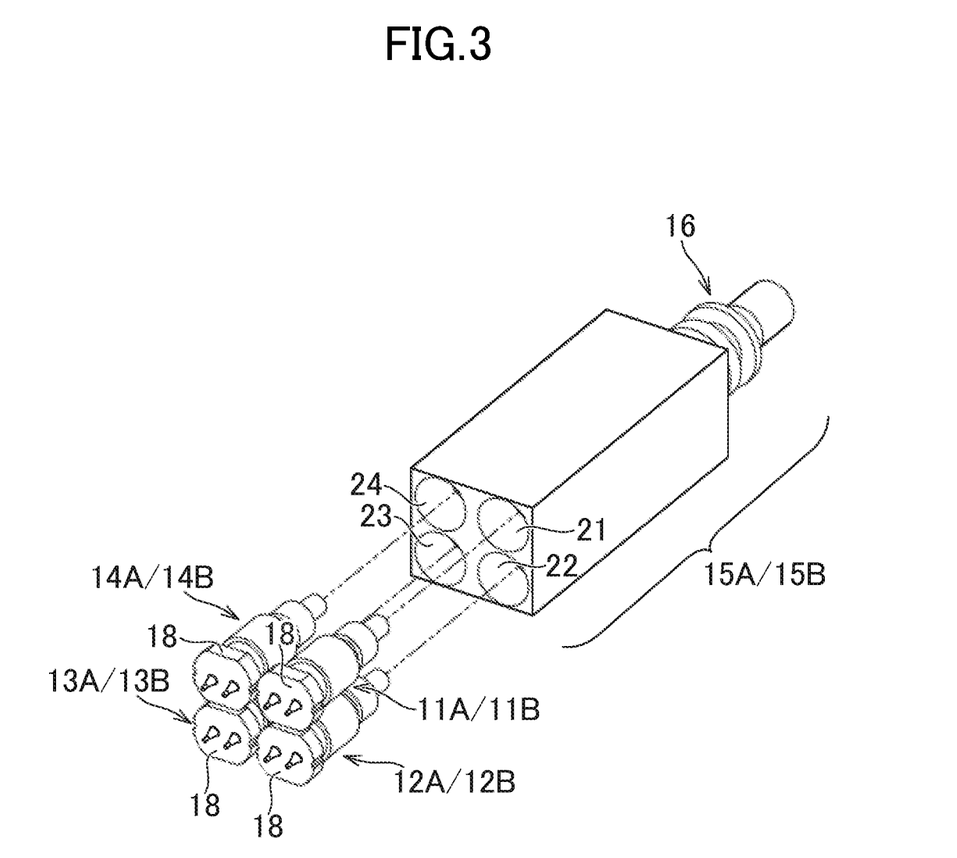
FIG. 3 is a schematic perspective diagram illustrating the configurations of the optical transmitter module and the optical receiver module according to the first embodiment of the present invention.

FIG. 3 is a schematic perspective diagram illustrating the configurations of the optical transmitter module 2A and the optical receiver module 2B according to the embodiment. FIG. 3 illustrates a state where the LD modules 11A, 12A, 13A, and 14A (or the PD modules 11B, 12B, 13B, and 14B) are detached from the optical transmitter module 2A (or the optical receiver module 2B) that is illustrated in FIG. 2. Each LD module (or each PD module) includes a stem 18. At this point, the optical transmitter module 2A will be described. The optical MUX module 15A has four installation units, that is, installation units 21, 22, 23, and 24. The four installation units, that is, the installation units 21, 22, 23, and 24 come in contact with front terminals (ferrules 25 that will be described below) and joining places of the four LD modules, that is, the LD modules 11A, 12A, 13A, and 14A, respectively, for joining, and each installation unit has a function of holding and fixing the LD module.

Figure 4:
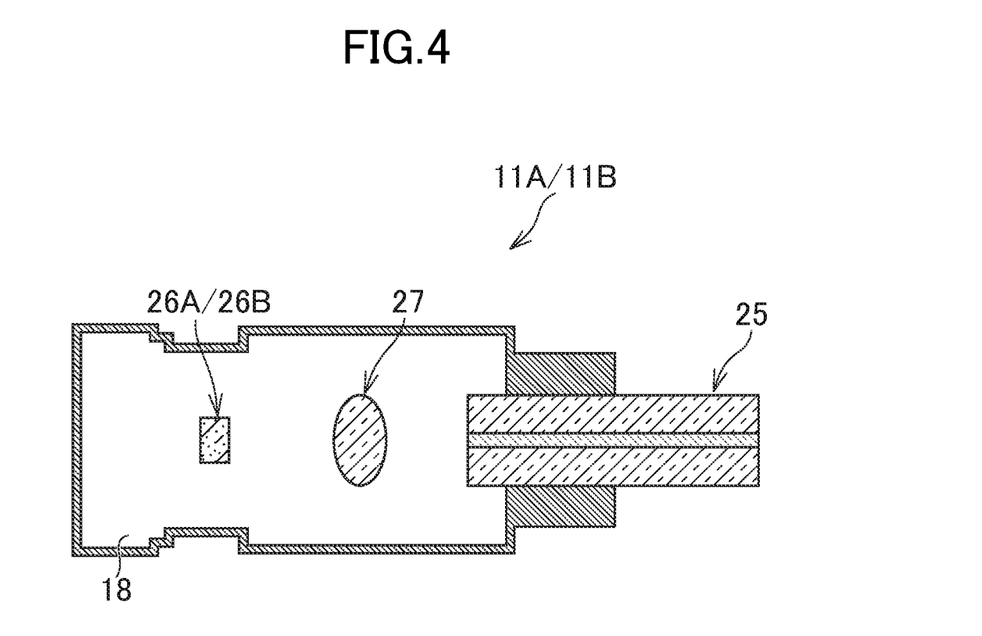
FIG. 4 is a schematic cross-sectional diagram illustrating configurations of an LD module and a PD module according to the first embodiment of the present invention.

FIG. 4 is a schematic cross-sectional diagram illustrating configurations of the LD module 11A and the PD module 11B. Other LD modules, that is, the LD modules 12A, 13A, and 14A (or other PD modules 12B, 13B, and 14B) have the same configuration as well. At this point, the LD module 11A will be described. In addition to the ferrule 25, the LD module 11A further includes a LD element 26A and a condensing lens 27. At this point, the LD element 26A is a light emitting element that converts the electric signal into the optical signal. The PD module 11B includes a PD element 26B instead of the LD element 26A. At this point, the PD element 26B is a light receiving element that converts the optical signal into the electric signal.

The LD module and the PD module are hereinafter referred to as an optical sub-assembly. The main feature of the optical module 1 according to the embodiment is a structure of a stem that is included in the optical sub-assembly and a structure of a flexible printed circuit that is electrically connected to the stem. In FIGS. 2 and 3, the LD modules 11A, 12A, 13A, and 14A (or the PD module 11B, 12B, 13B, and 14B) are illustrated, but a detailed structure of the stem 18 that is included in the LD module (or the PD module) is omitted for simplicity. The detailed structure of the stem 18 will be described below.

The optical module according to the embodiment includes a semiconductor optical element, a stem, and a wiring substrate. At this point, the semiconductor optical element is a light emitting element (for example, a LD element) that converts the electric signal into the optical signal, or is a light receiving element (for example, the PD element) that converts the optical signal into the electric signal. The LD module is a transmitter optical sub-assembly (TOSA) that is CAN type, and the LD element is stored in the LD module. The PD module is a receiver optical sub-assembly (ROSA) that is CAN type, and the PD element is mounted into the PD module. That is, the optical sub-assembly includes the semiconductor optical element and the stem. Furthermore, the wiring substrate here is a flexible printed circuit. In FIG. 1, the flexible printed circuits 3A and 3B are illustrated for simplicity, but in real, the flexible printed circuit 3A (or the flexible printed circuit 3B) are made up of four flexible printed circuits. This is because the optical transmitter module 2A (or the optical receiver module 2B) includes four LD modules, that is, the LD modules 11A, 12A, 13A, and 14A (or four PD modules, that is, the PD modules 11B, 12B, 13B, and 14B), and the flexible printed circuit is electrically connected to each LD module (or each PD module). That is, each optical sub-assembly is electrically connected to the corresponding flexible printed circuit.

The transmission equipment according to the embodiment is transmission equipment into which the optical module according to the embodiment is mounted. The optical transmission system according to the embodiment is an optical transmission system that includes two transmission equipments, two optical modules that are mounted into the two transmission equipments, respectively, and an optical fiber that connects the two optical modules to each other.

Figure 5:
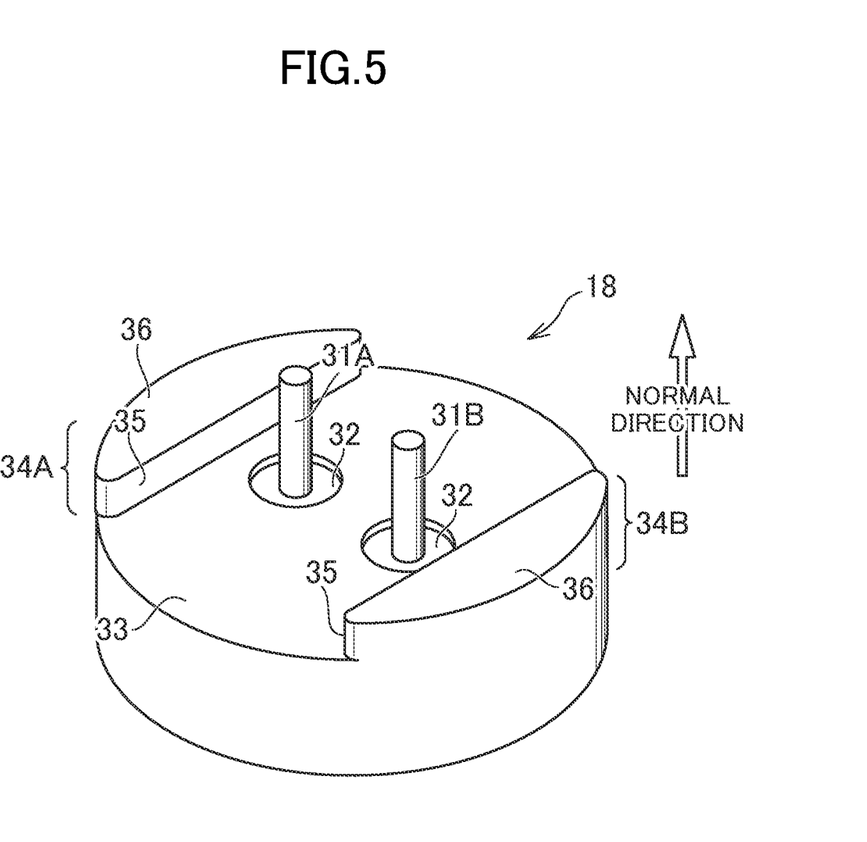
FIG. 5 is a perspective diagram illustrating a structure of a stem according to the first embodiment of the present invention.

FIG. 5 is a perspective diagram illustrating a structure of the stem 18 according to the embodiment. A cross section of the stem 18 is approximately circular. The stem 18 includes a pair of lead terminals (lead pins) 31A and 31B. A pair of through-holes for the pair of lead terminals 31A and 31B are provided in a main body of the stem 18. The pair of lead terminals 31A and 31B are arranged in such a manner that the pair of lead terminals 31A and 31B pass through the pair of through-holes, respectively. An insulating object (for example, a glass object) 32 is positioned between each of the pair of lead terminals 31A and 31B and each of the pair of through-holes. At this point, the LD element includes one pair of signal electrodes and a ground electrode. The pair of signal electrodes are electrically connected to the pair of lead terminals 31A and 31B, respectively. The ground electrode is electrically connected to the main body of the stem 18. That is, the LD element is the light emitting element. The pair of lead terminals 31A and 31B transfer electric signals that are input into the LD element. Furthermore, in a case where the optical sub-assembly is the PD module, the semiconductor optical element is the PD element and the PD element is the light receiving element. The pair of lead terminals 31A and 31B transfer electric signals that are output from the PD element.

The stem 18 includes a placing surface 33 and two or more protrusion portions. At this point, the stem 18 has two protrusion portions, that is, protrusion portions 34A and 34B. Each of the two protrusion portions, that is, the protrusion portions 34A and 34B, has a flank surfaces 35 and an upper step surfaces 36. The flank surfaces 35 extend upward (in the upward direction in FIG. 5) from edges, respectively, of both sides of a placing surface 33. The upper step surfaces 36 extend in parallel to the placing surface 33 from upper edges, respectively, of the flank surface 35. That is, an upper surface that is connected to a flexible printed circuit 40, of the stem 18 has a stepped structure that is defined by the placing surface 33 and the two protrusion portions, that is, the protrusion portions 34A and 34B, that are arranged on both sides of the placing surface 33, respectively. The two protrusion portions, that is, the protrusion portions 34A and 34B, protrude along a direction normal to the placing surface 33 (toward the upward direction in FIG. 5). A shape that relates to this, of the stem 18 can be formed more easily than by metal forming.

Figure 6A:
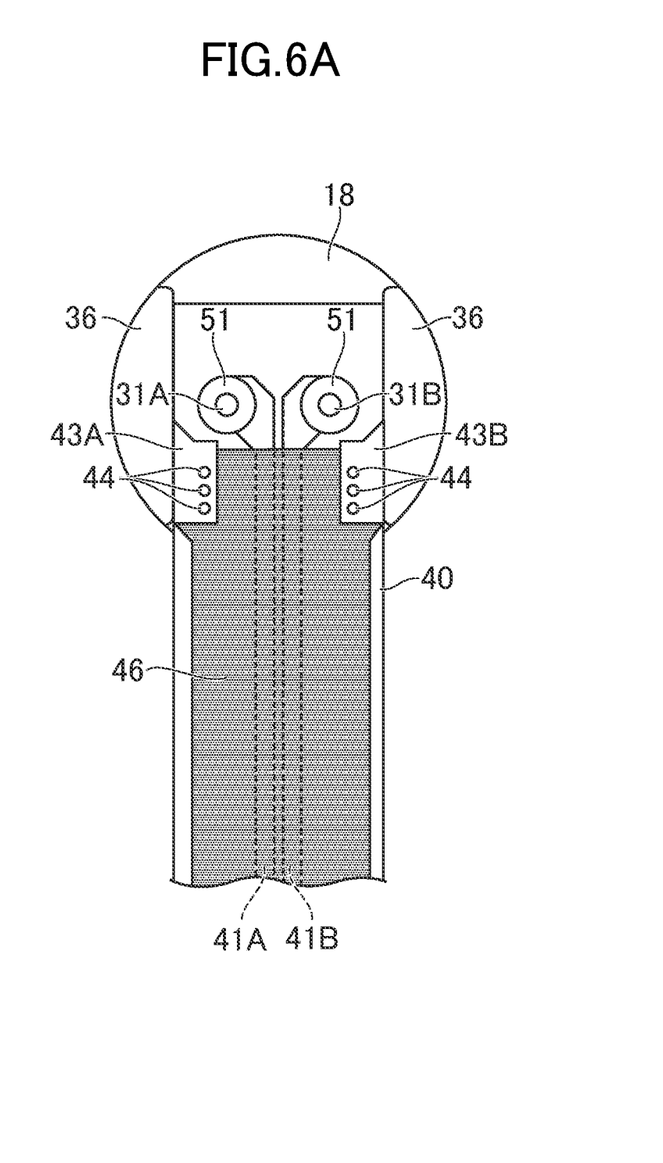
FIG. 6A is a top-view diagram illustrating a structure of a flexible printed circuit according to the first embodiment of the present invention.
Figure 6B:
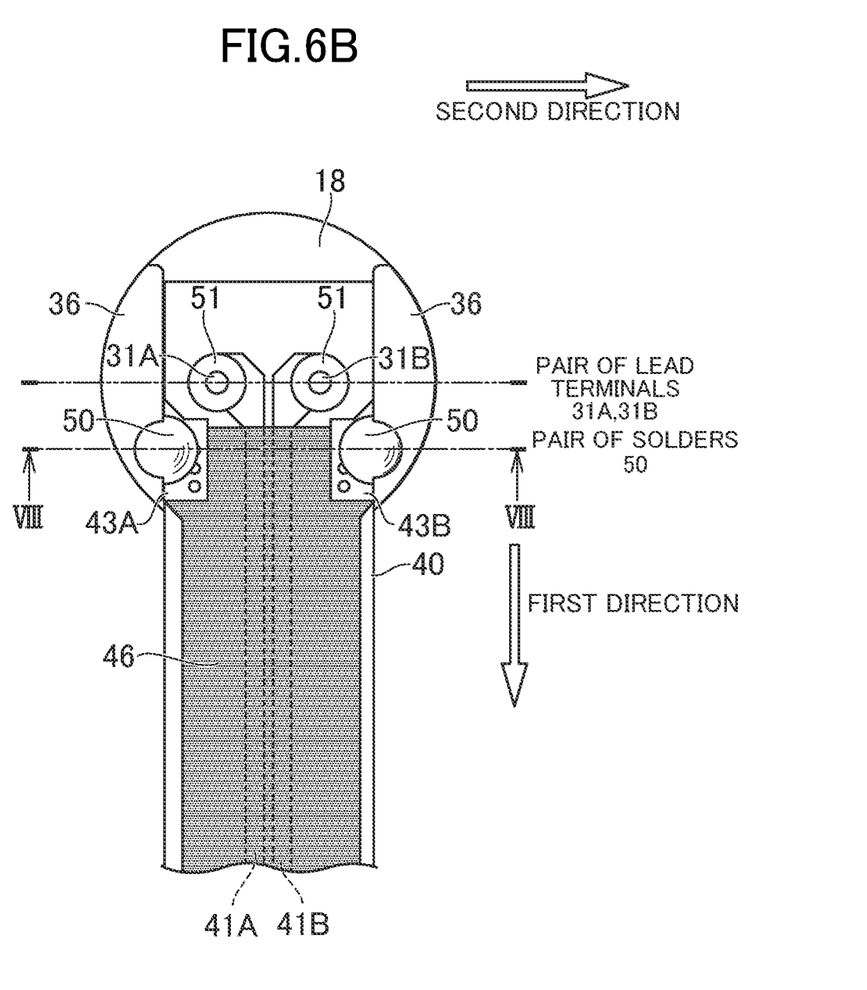
FIG. 6B is a top-view diagram illustrating the structure of the flexible printed circuit according to the first embodiment of the present invention.

FIGS. 6A and 6B are top-view diagrams illustrating a structure of the flexible printed circuit 40 according to the embodiment. FIGS. 6A and 6B illustrate a state where the flexible printed circuit 40 is connected to the stem 18. It is noted that, to make the structure clear, FIG. 6A illustrates a state that appears before a solder 50 is positioned, and FIG. 6B illustrates a state where the solder 50 is positioned.

The flexible printed circuit 40 is an example of the wiring substrate. The flexible printed circuit 40 further includes a pair of strip conductors 41A and 41B that are arranged on a front surface thereof, and a ground conductor layer 42 (not illustrated) that is positioned on a rear surface thereof. At this point, the rear surface of the flexible printed circuit 40 is a surface that faces the placing surface 33 of the stem 18. The front surface is a surface that opposite to the rear surface. The flexible printed circuit 40 further includes two ground conductor patterns, that is, ground conductor patterns 43A and 43B, that are arranged on regions, respectively, of the front surface, which are in the vicinity of the two protrusion portions, that is, the protrusion portions 34A and 34B. Each ground conductor pattern that is positioned on the front surface and the ground conductor layer 42 that is positioned on the rear surface are electrically connected to each other. In order to reliably make the electrical connection, the flexible printed circuit 40 includes one or more through-holes 44 in regions, respectively, in which the two ground conductor patterns, that is, the ground conductor patterns 43A and 43B, are arranged, when viewed from above. At this point, each ground conductor pattern includes three through-holes 44. Each through-hole 44 passes through the flexible printed circuit 40 from the front surface to the rear surface. With the solder 50, through at least a part of the three through-holes 44, each of the two ground conductor patterns, that is, the ground conductor patterns 43A and 43B, is electrically connected to the ground conductor layer 42. At this point, as illustrated in FIG. 6B, among three through-holes 44 in each ground conductor pattern, the closest through-hole to the pair of lead terminals 31A and 31B is completely covered with the solder 50, and a part of the second closest through-hole is covered with the solder 50.

At this point, a micro strip type differential transmission line is configured to include the pair of strip conductors 41A and 41B and the ground conductor layer 42. The pair of strip conductors 41A and 41B, each of which maintains a fixed width (a conductor with), extend in a first direction (in the vertical direction in FIGS. 6A and 6B) in parallel to each other, while they are at a fixed distance (a conductor distance) away from each other. Because one ends (upper side ends in FIGS. 6A and 6B) of the pair of strip conductors 41A and 41B are connected to the pair of lead terminals 31A and 31B, respectively, the one ends are somewhat broadened to both sides and take the shapes in which regions in which the pair of lead terminals 31A and 31B are arranged are surrounded. The flexible printed circuit 40 includes one pair of openings 45A and 45B (not illustrated) that pass through the pair of strip conductors 41A and 41B, respectively, in regions in which the pair of lead terminals 31A and 31B are arranged, respectively. In a state where the flexible printed circuit 40 is connected to the stem 18, the pair of lead terminals 31A and 31B pass through the pair of openings 45A and 45B, respectively. The pair of lead terminals 31A and 31B of the stem 18 are electrically connected to the pair of strip conductors 41A and 41B of the flexible printed circuit 40, respectively, with solders 51.

It is noted that a cover lay 46 is positioned on the front surface of the flexible printed circuit 40, covering the pair of strip conductors 41A and 41B, except for regions in which the connections to the pair of lead terminals 31A and 31B are made, and regions in which the solders 50 that electrically connect the main body of the stem 18 and each of the two ground conductor patterns, that is, the ground conductor patterns 43A and 43B, are positioned. That is, the pair of strip conductors 41A and 41B are arranged on the front surface (which is opposite to the rear surface facing the placing surface 33 of the stem 18) of the flexible printed circuit 40. However, the cover lay 46 is positioned on the outermost layer, and the pair of strip conductors 41A and 41B themselves are not the outermost layer, except for one or several regions. However, at this point, it is assumed that the pair of strip conductors 41A and 41B may be arranged on the front surface of the flexible printed circuit 40. In the same manner, the ground conductor layer 42 is basically positioned over the entire rear surface of the flexible printed circuit 40. In the same manner as on the front surface of the flexible printed circuit 40, the cover lay is positioned covering the ground conductor layer 42, except for a portion (at least one or several parts of a portion) facing the placing surface 33 of the stem 18. That is, the ground conductor layer 42 is positioned on the rear surface (which faces the placing surface 33 of the stem 18) of the flexible printed circuit 40. However, the cover lay is positioned on the outermost layer, and the ground conductor layer 42 itself is not the outermost layer, except for one or several regions. However, at this point, it is assumed that the ground conductor layer 42 may be positioned on the rear surface of the flexible printed circuit 40.

The feature of the optical module 1 according to the embodiment is that the main body of the stem 18 and the ground conductor layer 42 of the flexible printed circuit 40 are electrically connected to each other by performing brazing or soldering. The stem 18 has the two protrusion portions, that is, the protrusion portions 34A and 34B. Furthermore, the flexible printed circuit 40 includes two ground conductor patterns 43A and 43B that are arranged on regions, respectively, of the front surface, which are in the vicinity of the two protrusion portions, that is, the protrusion portions 34A and 34B. Two solders 50 physically come into contact with two protrusion portions, that is, the protrusion portions 34A and 34B, and two ground conductor patterns, that is, the ground conductor patterns 43A and 43B, respectively, and thus the two protrusion portions, that is, the protrusion portions 34A and 34B are electrically connected to the two ground conductor patterns, that is, the ground conductor patterns 43A and 43B, respectively. The solder 50 is positioned covering the upper step surfaces 36 of the two protrusion portions, that is, the protrusion portions 34A and 34B, but a residue portion of the solder 50 that is attached to the upper step surface 36 flows along the flank surface 35 down to the placing surface 33 side. Because of this, the solder 50 is suppressed from flowing out to outside of the upper step surface 36, that is, to outside of an outer edge of the stem 18. The solder 50 is suppressed from flowing to the external side of the outer edge of the stem 18, and thus yield is improved, and a space that is needed because of a shift in a position of the solder 50 can be reduced. Because of this, contribution to the miniaturization can also be achieved. Because there is no need to install a lead ground terminal on the stem, contribution to a low cost can be achieved.

In the optical module 1 according to the embodiment, as illustrated in FIG. 6B, it is desirable that the pair of lead terminals 31A and 31B are positioned side by side in a second direction that intersects the first direction (in a direction in which the pair of strip conductors 41A and 41B extends). At this point, it is further desirable that the second direction is substantially orthogonal to the first direction. Furthermore, in the optical module 1 according to the embodiment, as illustrated in FIG. 6B, it is desirable that on the front surface of the flexible printed circuit 40, places where the two solders 50 (a pair of solders 50) are arranged, that is, regions where the two ground conductor patterns, that is, the ground conductor patterns 43A and 43B, are soldered to the two protrusion portions, that is, the protrusion portions 34A and 34B, respectively, are arranged in the direction (in the downward direction that is illustrated in FIG. 6B) in which the pair of strip conductors 41A and 41B extend in such a manner to run in the first direction away from the pair of lead terminals 31A and 31B, respectively. In a state where the stem 18 and the flexible printed circuit 40 are connected to each other, in a case where an external force is applied to these, a place where the heaviest stress occurs is a position where the flexible printed circuit 40 is bent, and such a position is in the vicinity of the outer edge of the stem 18 when the flexible printed circuit 40 is viewed from above. Heavy stress can be suppressed from occurring in portions (places where two solders 51 are arranged) where the pair of lead terminals 31A and 31B are connected to the pair of strip conductors 41A and 41B, respectively, depending on whether places where the two solders 50 are arranged is in the vicinity of the outer edge or is between the vicinity of the outer edge and each of the pair of lead terminals 31A and 31B, along the first direction.

Figure 7:
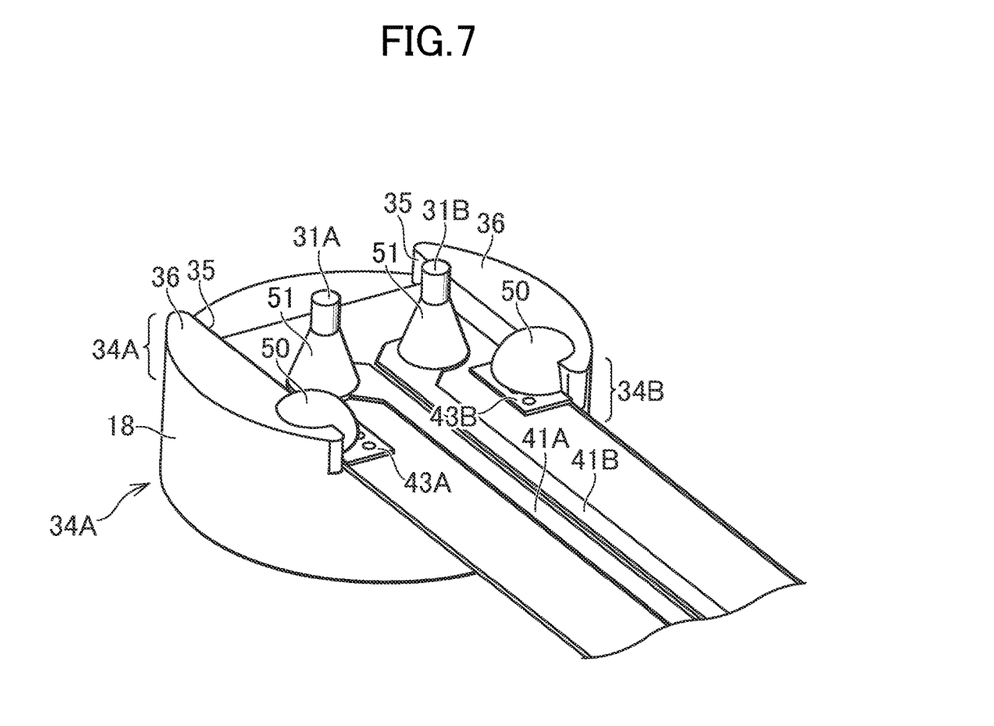
FIG. 7 is a perspective diagram of the stem and the flexible printed circuit according to the first embodiment of the present invention.
Figure 8:
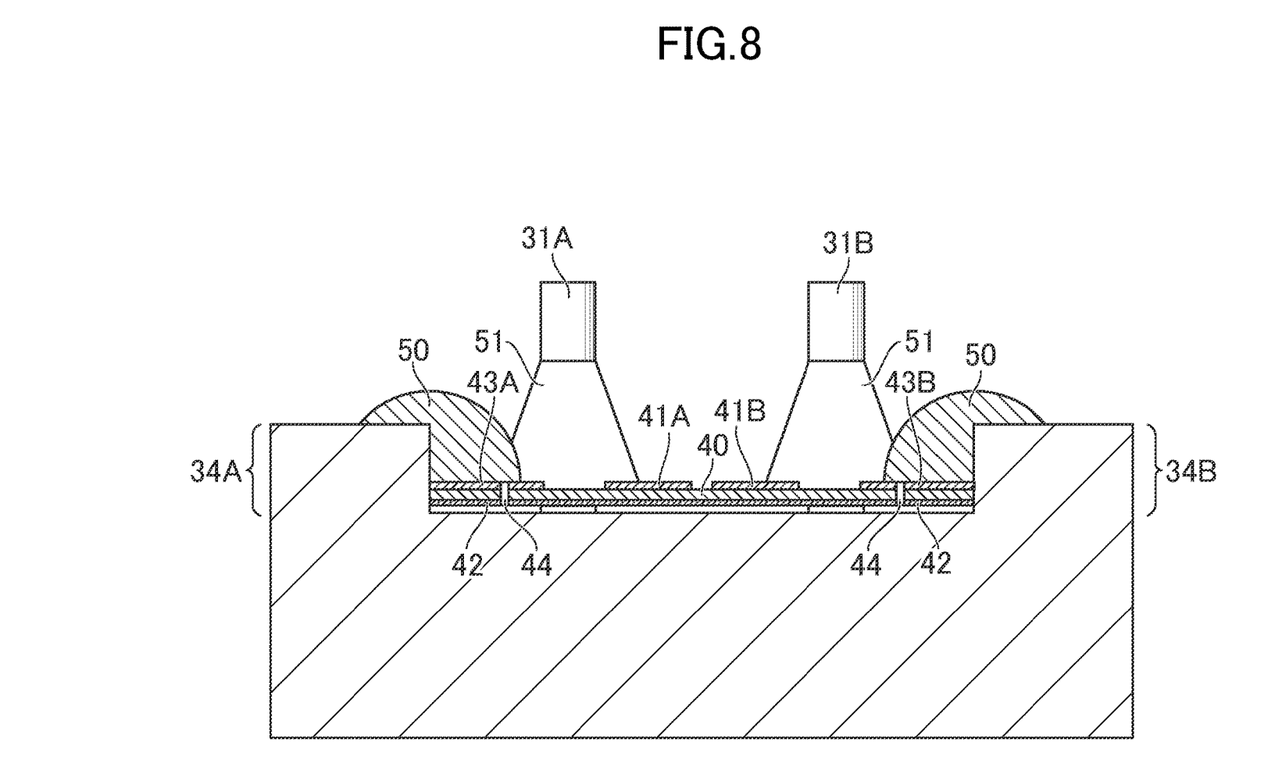
FIG. 8 is a cross-sectional diagram of the stem and the flexible printed circuit according to the first embodiment of the present invention.

FIG. 7 is a perspective diagram of the stem 18 and the flexible printed circuit 40 according to the embodiment. FIG. 8 is a cross-sectional diagram of the stem 18 and the flexible printed circuit 40 according to the embodiment. A cross section that is illustrated in FIG. 8 depicts a cross section taken along line VIII-VIII in FIG. 6B. It is noted that the cover lay 46 is not illustrated in FIGS. 7 and 8 for brief description. As illustrated in FIGS. 7 and 8, a height of the upper step surface 36 of each of the two protrusion portions, that is, the protrusion portions 34A and 34B, is greater than a height of an upper surface of the flexible printed circuit 40 in a connected state. A distance between the placing surface 33 and an uppermost portion (a portion that is farthest away from the placing surface 33) of each of the protrusion portions 34A and 34B is greater than a thickness of the flexible printed circuit 40. The stem 18 has such a structure, and thus, as illustrated in FIGS. 7 and 8, the two solders 50 are arranged over a region ranging from the upper step surface 36 of each of the two protrusion portions, that is, the protrusion portions 34A and 34B, through the flank surface 35 to the ground conductor patterns 43A and 43B. In this manner, with the solder 50, the flexible printed circuit 40 is fixed in a manner that is pressed from above, and thus an effect in which the flexible printed circuit 40 is prevented from being peeled can also be obtained.

With an increase in communication traffic in recent years, there is an increasing demand for miniaturization for realizing an optical module that enables high-density transmission and for a low cost. Multi-source agreements (MSA) for such an optical module have been concluded among makers, and manufacturing in compliance with the same specifications concerning electrical properties, optical properties, external form dimensions, and the like has been in progress. Concerning the external form dimensions of the optical module, for example, there are specifications, such as Centum (gigabit) Form factor Pluggable (CFP) for 100 Gbit/s optical communication module, and CFP 2 and CFP 4 for reducing an external form of a 100 Gbit/s optical communication module. These specifications establish positions of a receptacle for optical transmission, a receptacle for optical reception, and an electric interface card edge. It is considered that the trend for the specification and miniaturization described above will continue in future.

As an optical transmitter module that is mounted into 100 Gbits/s optical module in order to perform the high-density transmission, TOSAs that result from integrating four LD elements that oscillate at different wavelengths into one package have come into widespread use. However, this optical transmitter module, of which the packaging cost is high, is difficult to package. Furthermore, when a characteristic defect occurs in a LD element in one lane, although LD elements in other three lanes are good-quality products, the TOSA itself is a defective product. Because of this, a decrease in yield is easily caused, and a cost reduction is prevented.

Accordingly, like the optical module 1 according to the embodiment, the optical transmitter module 2A includes the four LD modules, that is, the LD modules 11A, 11B, 11C, and 11D. For each LD module, one LD element may be mounted into a package, and the miniaturization and low cost can be realized. Therefore, as illustrated in FIG. 3, the optical transmitter module 2A into which the four LD modules are mounted can be accommodated in a case of the optical module (an optical transceiver) that is stipulated in the MSA, an improvement in yield or a reduction in the cost of manufacturing the package can be realized, and contribution to the low cost of the optical module itself can be achieved.

Each LD module according to the embodiment has an excellent packaging property, and the miniaturization is also possible. Generally, a CAN type optical module that is used for optical communication has a stem and one or more lead terminals, and with the stem and a cap that is attached to the stem, a case that accommodates a semiconductor optical element is configured. Then, the lead terminal and the stem constitutes a coaxial line. The lead terminal and the stem are connected to a drive device that outputs a modulation electric signal, through the wiring substrate, such as an FPC.

In 10 Gigabit Small Form Factor Pluggable (XFP) or Small Form Factor Pluggable (SFP+), according to which 10 GHz transmission is possible, a $\phi$5.6 mm CAN type package is adapted. In CFP 4 or Quad Small Form Factor Pluggable 28 (QSFP 28), a plurality of TOSAs can also be accommodated into a smaller-sized optical module, and the optical module 1 according to the embodiment is optimal for CFP 4 or QSFP 28. Application of the present invention to a TOSA that adapts a $\phi$4 mm or less coaxial-type package is optimal, but no limitation to TOSA is imposed. A ROSA may be available. Furthermore, a bi-directional optical sub-assembly (BOSA) in which an optical transmitter and an optical receiver are accommodated together may be available. In a case where the electric signal is transmitted as a differential signal, a pair of lead terminals are necessary, and in a case where the electric signal is transmitted as a single-ended signal, one lead terminal may be available. Furthermore, as is the case with the BOSA, in a case where both an electricity input signal and an electricity output signal are transmitted, and in a case where both the electricity input signal and the electricity output signal are differential signals, two pairs of lead terminals are necessary. In either case, a strip conductor that is connected to each of one or more lead terminals is positioned on a surface of the wiring substrate. Furthermore, in a case where the TOSA further includes a monitoring PD element that monitors an optical output of the LD element, both a pair of lead terminals for an electric signal (the differential signal) that is input into the LD optical element and one lead terminal for an electric signal that is output from the monitoring PD element are necessary. A total of three lead terminals are arranged in the stem 18. Three strip conductors are arranged on the surface of the wiring substrate. In either case, it is desirable that regions where two ground conductor patterns are brazed or soldered to the two protrusion portions, that is, the protrusion portions 34A and 34B, are arranged in a direction in which one or more strip conductors extends along the first direction from one or more lead terminals, from a place where the one or more lead terminals are arranged.

In φ5.6 mm TOSAs that at present, generally, have come into widespread use, a connection between a stem that includes a lead signal terminal and a lead ground terminal and a wiring substrate in which a plurality of openings (through-holes) are made by inserting the lead signal terminal and the lead ground terminal into corresponding through-holes, respectively, for soldering and causing each of these to be electrically connected. At this point, a brazing region of the wiring substrate is greater in diameter than the lead ground terminal, and a diameter of the corresponding opening is further increased. For example, in a case where an external form of the lead ground terminal is φ0.3 mm, an external form of the brazing region is φ0.55 mm. Because an external form of a position intersection point is φ0.15 mm in size, a diameter of the corresponding opening is φ0.7 mm, a large area is required. Furthermore, in JP 2006-080418 A, a structure in which a hole is pierced in a stem is disclosed. An external form of an opening can be suppressed to φ45 mm, but when a TOSA is further miniaturized and thus an external form of the stem is, for example, φ3 to φ4 mm, a process of piercing a hole is difficult. In contrast, in the optical module 1 according to the embodiment, there is no need for the lead ground terminal, and for this reason, a space that is to be provided is unnecessary. Thus, the optical module 1 has a structure optimal for the miniaturization of the optical module. As described above, the present invention is optimal for the optical transmitter module, but no limitation to this is imposed. The present invention can be applied to any optical receiver module (ROSA) and any optical transmission and reception module (BOSA).

Second Embodiment

Figure 9:
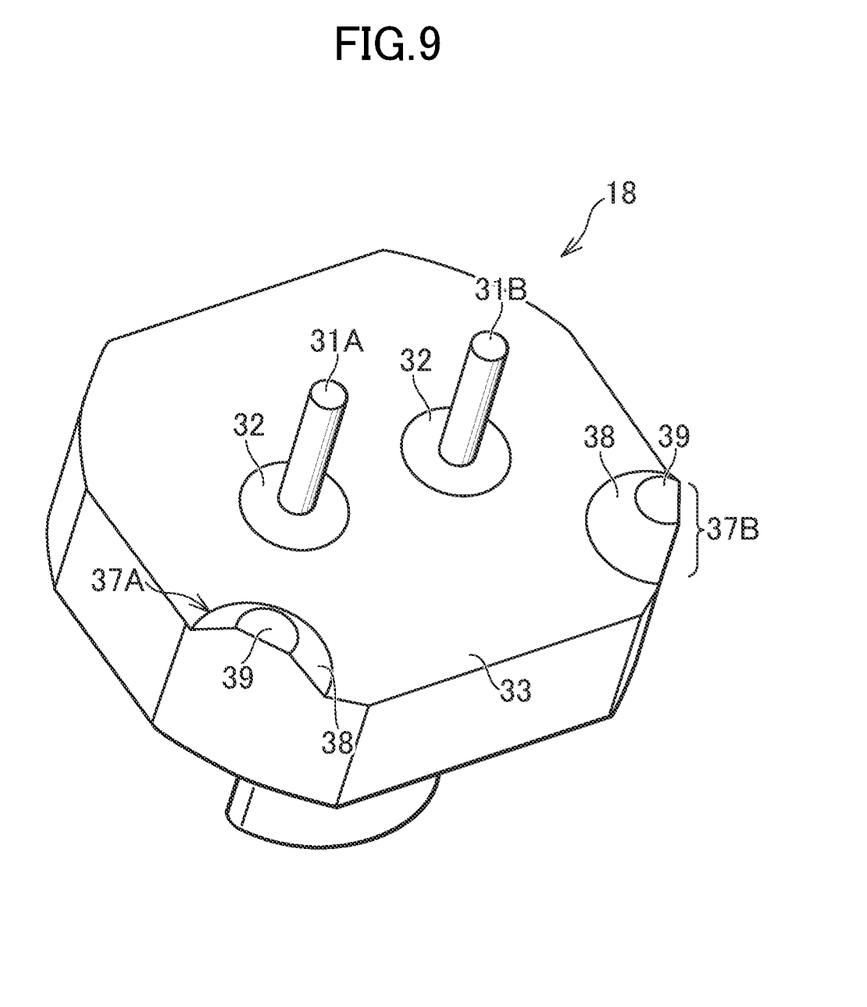
FIG. 9 is a perspective diagram illustrating a structure of a stem according to a second embodiment of the present invention.

FIG. 9 is a perspective diagram illustrating a structure of a stem 18 according to a second embodiment of the present invention. In an optical module 1 according to the embodiment, a structure of the stem 18 is different from that of the stem 18 according to the first embodiment, but other structures are the same as those according to the first embodiment. This is true for transmission equipment 100 and an optical transmission system according to the embodiment. As illustrated in FIG. 9, a cross section of the stem 18 is approximately octagonal. The stem 18 includes a pair of lead terminals 31A and 31B, and has the placing surface 33, and two protrusion portions, that is, protrusion portions 37A and 37B. The two protrusion portions, that is, the protrusion portions 37A and 37B are provided to come into contact with two oblique sides, respectively, each of which interposes a side which is at a place where a flexible printed circuit 40 traverses an outer edge of the stem 18, into both sides. The two protrusion portions, that is, the protrusion portions 37A and 37B have the shape of an approximately semi-truncated-cone that results from cutting an approximately circular truncated cone across cross sections that pass through the center of an upper bottom surface and the center of a lower bottom surface. Each of the two protrusion portions, that is, the protrusion portions 37A and 37B, has a flank surface 38 that obliquely extends from the placing surface 33, and an upper step surface 39 that extends from upper edge of flank surface 38 in the shape of an approximately semicircle.

Figure 10:
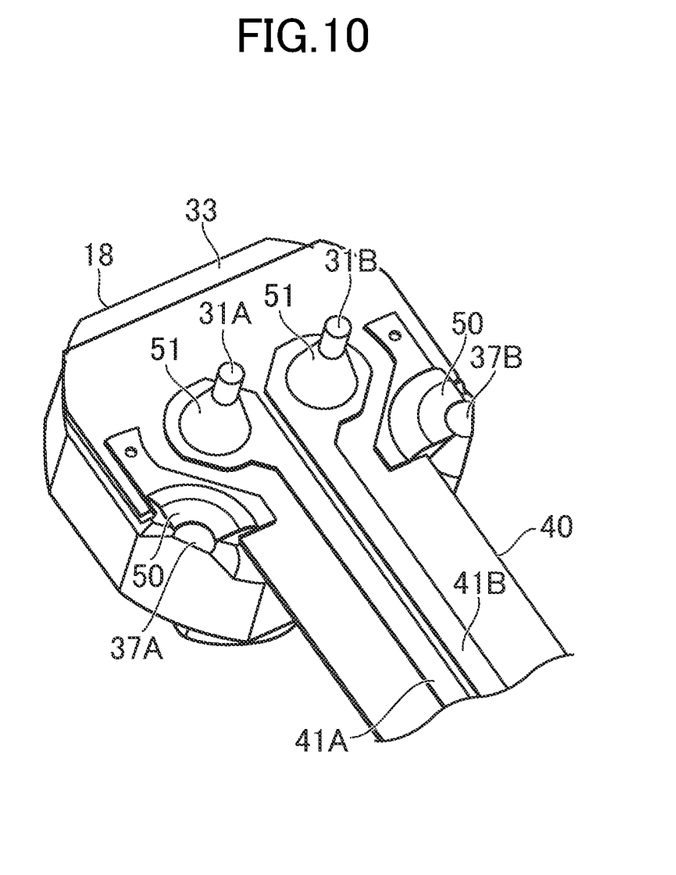
FIG. 10 is a perspective diagram illustrating the stem and a flexible printed circuit according to the second embodiment of the present invention.

FIG. 10 is a perspective diagram of the stem 18 and the flexible printed circuit 40 according to the embodiment. As illustrated in FIG. 10, a height of the upper step surface 39 of each of the two protrusion portions, that is, the protrusion portions 37A and 37B, is greater than a height of an upper surface of the flexible printed circuit 40 in a connected state. A distance between the placing surface 33 and an uppermost portion of each of the protrusion portions 37A and 37B is greater than a thickness of the flexible printed circuit 40. The stem 18 has such a structure, and thus, as illustrated in FIG. 10, the two solders 50 are arranged over a region ranging from the upper step surface 39 of each of the two protrusion portions, that is, the protrusion portions 34A and 34B, through the flank surface 38 to the ground conductor patterns 43A and 43B.

A cross section of the stem 18 according to the embodiment has the shape of approximately an octagon, and thus, as illustrated in FIGS. 2 and 3, in a case where four optical sub-assemblies are mounted in such a manner that two sub-assemblies run side by side vertically and two sub-assemblies run side by side horizontally (2×2), a higher-density package is possible. As is the case with the first embodiment, the solder 50 is suppressed from flowing out to outside of the upper step surface 39, that is, to outside of an outer edge of the stem 18. Consequently, both of the miniaturization and the low cost can be realized.

The optical module, the transmission equipment, and the optical transmission system according to the embodiment of the present invention are described above. The present invention is not limited to the embodiments described above and can be widely applied to an optical transmitter module and an optical receiver module. Therefore, the present invention can be widely applied to an optical module that includes the optical transmitter module and/or the optical receiver module. As an example of the wiring substrate, the flexible printed circuit is given, but no limitation to this is imposed, and other wiring substrates may be available. Furthermore, as an example of the brazing, the soldering is given, but no limitation to this is imposed, and other brazing (brazing connection) may be available.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical module comprising:
   a semiconductor optical element;
   a stem including one or more lead terminals, the one or more lead terminals transferring an electric signal that is input into the semiconductor optical element and/or that is output from the semiconductor optical element; and
   a wiring substrate including one or more openings through which the one or more lead terminals, respectively, pass,
   wherein the stem has a main body including a placing surface which the wiring substrate faces and on which the wiring substrate is placed, and two protrusion portions that are arranged as stepped portions on both sides of the placing surface, respectively, of the wiring substrate, and that protrude higher than the placing surface in a direction normal to the placing surface,
   wherein the main body and the protrusion portions of the stem are made of a same material,
   wherein the wiring substrate further includes: a ground conductor layer being positioned on a rear surface that faces the placing surface of the stem; and two ground conductor patterns being positioned on a front surface opposite to the rear surface, arranged on regions, respectively, of the front surface that are in the vicinity of the two protrusion portions, and being electrically connected to the ground conductor layer, and wherein the two protrusion portions of the stem are electrically connected to the two ground conductor patterns, respectively, by a braze or a solder.

2. The optical module according to claim 1,
wherein the wiring substrate includes one or more through-holes in regions on which the two ground conductor patterns, respectively, are arranged, when viewed from above, and
wherein the two ground conductor patterns are electrically connected to the ground conductor layer through at least a part of the one or more through-holes, respectively, by the braze or the solder.

3. The optical module according to claim 1,
wherein the wiring substrate further includes one or more strip conductors that are electrically connected to the one or more lead terminals, respectively, and extend in a first direction from the one or more lead terminals, respectively, on the front surface, and
wherein a region where the two ground conductor patterns are brazed or soldered to the two protrusion portions, respectively, of the front surface of the wiring substrate are arranged in a direction in which the one or more strip conductors extend along the first direction from the one or more lead terminals, respectively.

4. The optical module according to claim 1,
wherein a distance between the placing surface and an uppermost portion of each of the two protrusion portions is greater than a thickness of the wiring substrate.

5. The optical module according to claim 1,
wherein the one or more lead terminals that are included in the stem are a pair of lead terminals to which a differential signal is transmitted, and
wherein the pair of lead terminals are arranged side by side in a second direction that intersects the first direction.

6. A transmission equipment into which the optical module according to claim 1 is mounted.

7. The optical module according to claim 4,
wherein the two ground conductor patterns are electrically connected with the two protrusion portions, respectively, by the braze or the solder positioned to directly cover both of at least parts of the two protrusion portions and at least parts of the two ground conductor patterns.

8. The optical module according to claim 7,
wherein the braze or the solder is prevented from flowing out to outside of an outer edge of the stem.

* * * * *